US008284239B2

United States Patent
Chiu et al.

(10) Patent No.: US 8,284,239 B2
(45) Date of Patent: Oct. 9, 2012

(54) ASYNCHRONOUS PHOTOGRAPHY AUTOMOBILE-DETECTING APPARATUS

(75) Inventors: Chung-Cheng Chiu, Bade (TW); Wen-Chung Chen, Bade (TW); Meng-Liang Chung, Bade (TW)

(73) Assignee: National Defense University, Bade (TW)

( * ) Notice: Subject to any disclaimer, the term of this patent is extended or adjusted under 35 U.S.C. 154(b) by 668 days.

(21) Appl. No.: 12/458,291

(22) Filed: Jul. 8, 2009

(65) Prior Publication Data
US 2010/0013908 A1 Jan. 21, 2010

(30) Foreign Application Priority Data

Jul. 21, 2008 (TW) ................................ 97127565 A

(51) Int. Cl.
- H04N 15/00 (2006.01)
- H04N 13/02 (2006.01)
- G06K 9/00 (2006.01)
- G06K 9/62 (2006.01)

(52) U.S. Cl. ........................... 348/47; 382/154; 382/157
(58) Field of Classification Search .................. 348/47
See application file for complete search history.

(56) References Cited

U.S. PATENT DOCUMENTS

| 2004/0240725 A1* | 12/2004 | Xu et al. ....................... 382/154 |
| 2006/0222238 A1* | 10/2006 | Nishiyama .................... 382/154 |
| 2007/0206849 A1* | 9/2007 | Sakata et al. .................. 382/157 |

OTHER PUBLICATIONS

Gwenaëlle Toulminet, Massimo Bertozzi, Stéphane Mousset, Abdelaziz Bensrhair, and Alberto Broggi, Senior Member, IEEE, "Vehicle Detection by Means of Stereo Vision-Based Obstacles Features Extraction and Monocular Pattern Analysis", IEEE Transactions on Image Processing, vol. 15, No. 8, Aug. 2006.*
Narayan Srinivasa, "Vision-based Vehicle Detection and Tracking Method for Forward Collision Warning in Automobiles", Intelligent Vehicle Symposium, 2002. IEEE Volume: 2, Publication Year: 2002 , pp. 626-631 vol. 2.*

* cited by examiner

Primary Examiner — Sath V Perungavoor
Assistant Examiner — Xiaolan Xu
(74) Attorney, Agent, or Firm — Bacon & Thomas, PLLC

(57) ABSTRACT

The invention discloses the asynchronous photography for dual camera apparatus and processing the method for real-time forward vehicle detection. Image is captured by a pair of monochrome camera and stored into a computer. After the video pre-process, the edge information is used to locate the forward vehicle position, and then obtained the disparity from a fast comparison search algorithm by the stereo vision methodology. Proposed algorithm calculation of the invention can conquer the asynchronous exposure problem from dual camera and lower the hardware cost.

3 Claims, 7 Drawing Sheets

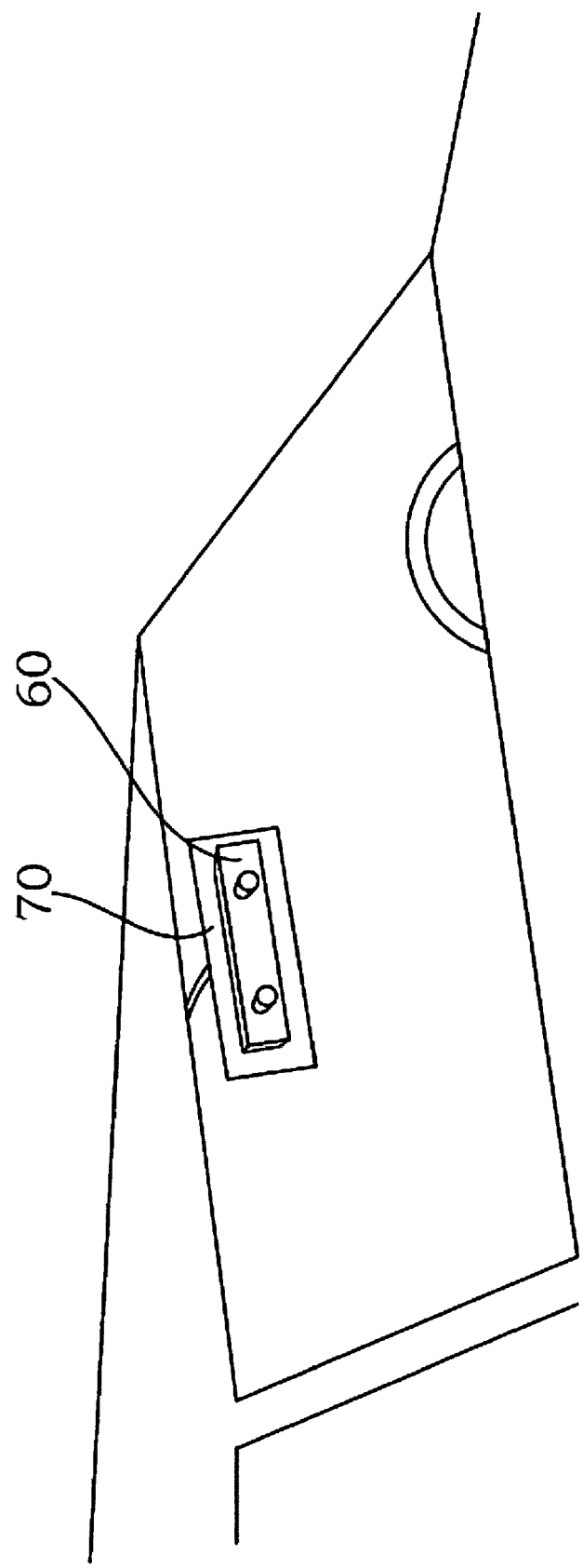

ASYNCHRONOUS PHOTOGRAPHY AUTOMOBILE-DETECTING APPARATUS

BACKGROUND OF THE INVENTION

1. Field of the Invention

The invention relates to an automobile-detecting apparatus, particularly to an asynchronous photography automobile-detecting apparatus.

2. Description of the Prior Art

In the conventional technology, a binocular cameras system installed on a same horizontal plane is used to carry on the distance measurement of stereovision, in order to form the image at the same time. There is a fixed distance between the binocular cameras, thus there is a disparity between left image and right image. This disparity is the coordinate difference of left image and right image at X-axis. The distance between object and lens can be obtained from the disparity (such as $\Delta P$) to obtain the goal of precise distance measurement.

The images taken by the conventional synchronous binocular cameras system are formed on a same horizontal line, no matter the object and the synchronous binocular cameras system are under static state, or the object and the synchronous binocular cameras system are under dynamic state. It is to say that the pixels of the object will drop on the same Y-axis of left image and right image. When the pixels of the object drop on the same Y-axis of left and right images, it will be beneficial for searching and comparing step. It not only can raise the processing speed, but also can increase the success rate of searching.

However, the synchronous binocular cameras system needs special extra hardware circuit and design, in order to trigger the exposure control of binocular cameras at the same time. It not only will increase the volume of camera, but also will raise the cost of cameras. Furthermore, the corresponding image retrieving device is required for the image retrieval at host computer end, which will increase the volume of equipment.

In addition, when the asynchronous binocular cameras system is used for vehicle detection, a difference value on the Y-axis of left image and right image (such as $\Delta Y$) will be generated due to the difference of exposure time and the vibration of vehicle body. It will cause the difficulty of comparison. Moreover, the respective exposure of asynchronous binocular cameras will cause different illumination and gray level between the left image and right image, due to the difference of shutter speed and aperture size during the exposure time.

As for the acquisition of disparity $\Delta P$, the left image and right image are searched totally to find out the difference at X-axis conventionally. Assume Sw denotes the width of searching scope and the left image and right image of synchronous binocular cameras lie at the same level, then the searching scope will be Sw×1. As for the asynchronous binocular cameras system, $\Delta Y$ has to be considered, thus the searching scope will be Sw×2×$\Delta Y$.

Thus, in the conventional synchronous photography technique, there are drawbacks of too large volume and high cost, and the asynchronous photography technique is not completely suitable for current vehicle detection technique. In order to meet the demand of vehicle detection, the relevant photography techniques have to be developed to save the cost of manpower and time etc., and the image of vehicle can be detected correctly.

SUMMARY OF THE INVENTION

The invention relates to a binocular and asynchronous photography automobile-detecting apparatus. Two low-cost and asynchronous cameras are installed at the same horizontal line on the rear-view mirror of vehicle. After the images are processed, the sound is used as the medium to transmit the distance information of the forward vehicles, so that the driver can make appropriate judgment.

The invention relates to a binocular and asynchronous photography automobile-detecting apparatus. It can overcome the difference illumination of the left image and right image effectively, in order to raise the distinguishing and detecting rate.

The invention relates to a binocular and asynchronous photography automobile-detecting apparatus. Under the condition without losing the precision, the problem of difference $\Delta Y$ can be solved, and the searching scope Sw×2×$\Delta Y$ can be reduced to obtain the disparity $\Delta P$ quickly and precisely.

The invention relates to a binocular and asynchronous photography automobile-detecting apparatus. The apparatus comprises a stereo image acquisition unit, an image pre-process unit, a searching object unit, a disparity matching unit, and an output unit.

After the images acquired by the cameras of the invention are stored into a computer, the images are pre-processed, and the edge information is used to locate the forward vehicle position, and then the disparity is obtained from a fast comparison search algorithm by the stereovision methodology. According to the disparity, the relative distance between the forward vehicle and the camera can be calculated.

The invention relates to a detection method for a binocular and asynchronous photography automobile-detecting apparatus. The above-mentioned vehicle coordinate information can be used for the edge accumulation detection, in order to obtain the vehicle coordinate information. And then the disparity of previous image can be used as the reference for the starting point of search.

The invention can overcome the difference of asynchronous exposure between two cameras, which also can overcome the distance measurement of dynamic stereovision, wherein the object and camera are kept at moving state.

The invention can effectively overcome the asynchronous exposure problem from dual cameras, reduce hardware construction cost of stereovision, accelerate the computing speed, and gain accurate real-time correct detection result in the practice.

The advantage and spirit of the invention can be understood further by the following detail description of invention and attached figures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 schematically shows the setup for the apparatus of the invention in the vehicle.

DESCRIPTION OF THE PREFERRED EMBODIMENT

Figure 1:
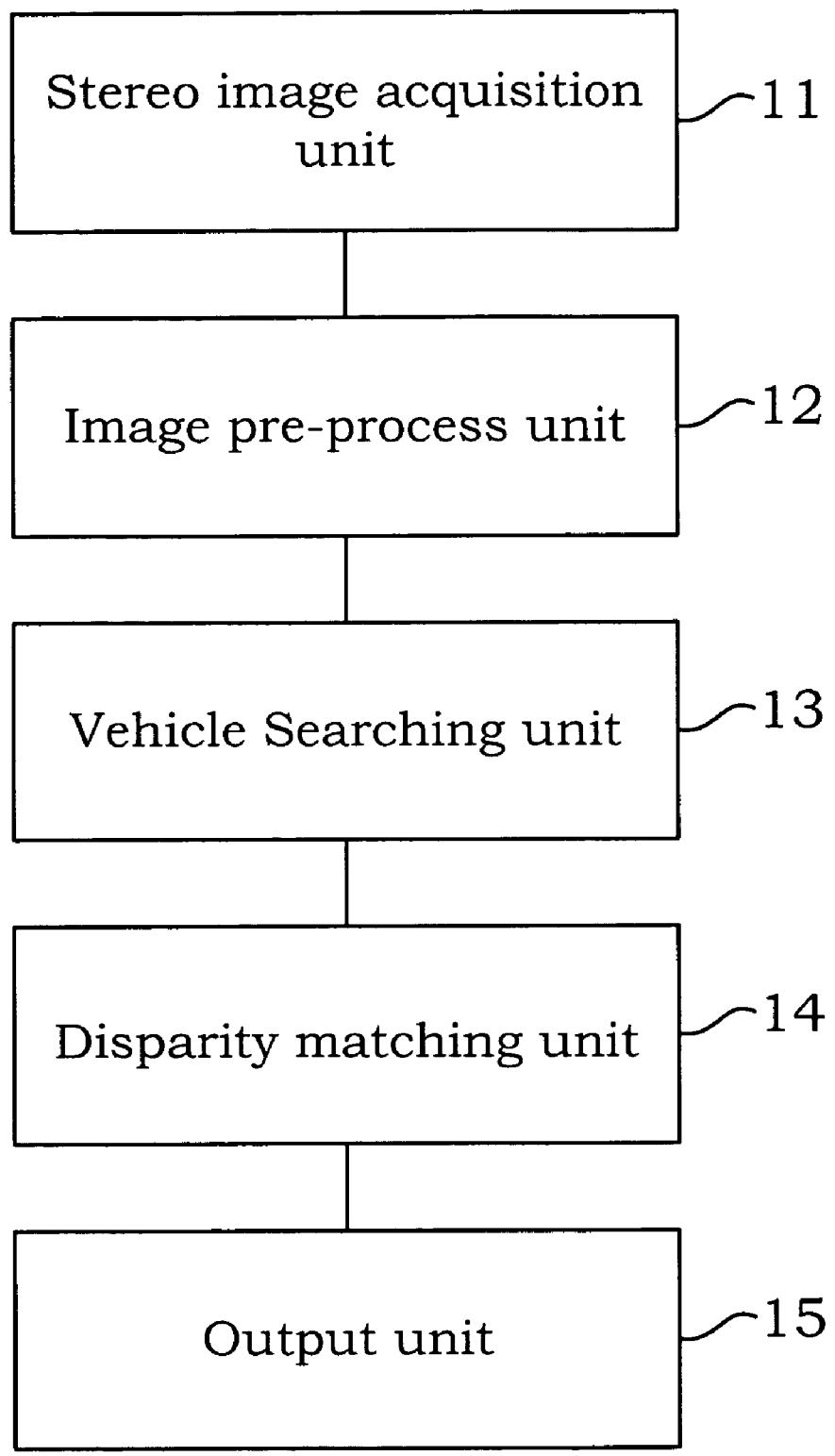
FIG. 1 schematically shows the apparatus for a preferred embodiment of the invention.

The invention provides an asynchronous photography automobile-detecting apparatus and a detection method. As shown in FIG. 1, the asynchronous photography automobile-detecting apparatus of the invention comprises a stereo image acquisition unit 11, an image pre-process unit 12, a object searching (vehicle) unit 13, a disparity matching unit 14, and an output unit 15. The details of each unit are described as follows.

The function of stereo image acquisition unit 11 shown in FIG. 1 is to capture the image into the memory of apparatus through dual cameras or multiple cameras.

Figure 2:
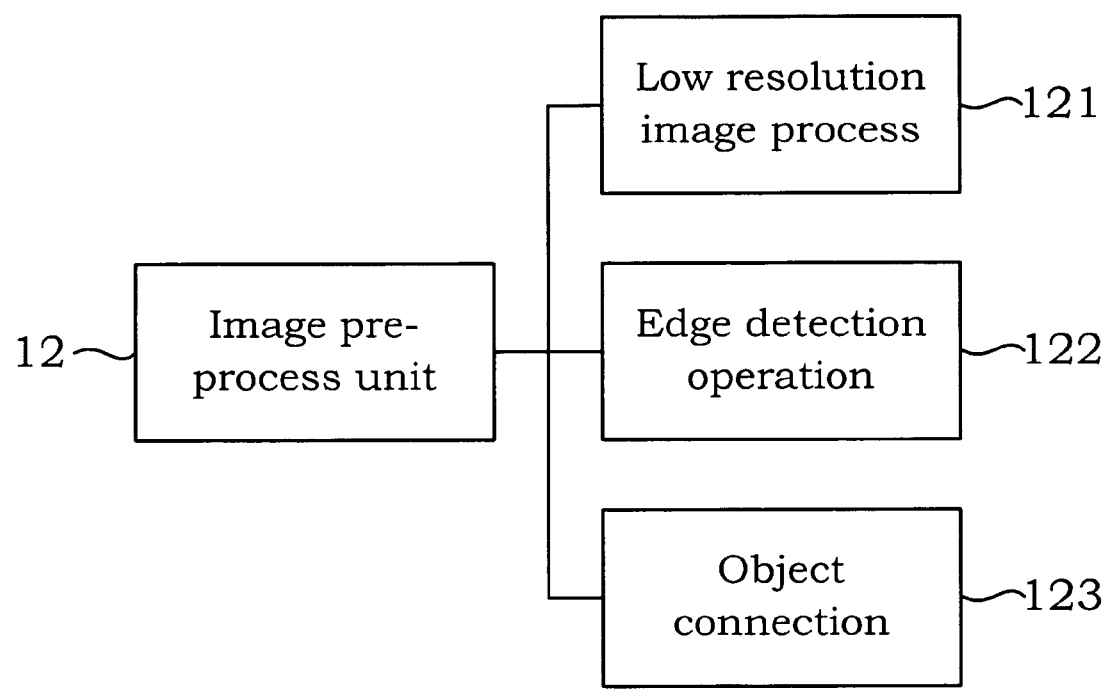
FIG. 2 schematically shows the image pre-process unit of the invention.

As shown in FIG. 2, the image pre-process unit 12 is used to pre-process the right image, in order to facilitate the acquisition of vehicle position. The function includes low resolution image process 121, edge detection operation 122, and object connection 123.

As shown in FIG. 2, the low resolution image process 121 will scan the horizontal and vertical directions of original frame and discard the extreme points to obtain the downsized image of original frame. Because the information of natural image owns good continuity, thus reducing the resolution of image not only can reduce the amount of information, but also can keep the most characteristics of the original image. Thus, the required operation amount of computation can be reduced greatly.

As shown in FIG. 2, object connection 123 can detect the contour of vehicle roof, top and bottom edges of trunk, and vehicle chassis through the simple edge detection for a clearer vehicle image. As for the forward vehicle, because the outer shape of vehicle is difficult to be changed by the influence of shadow and color, the horizontal features of vehicle contour will be very distinct. Thus the Sobel operator can be used to obtain the horizontal edge features.

As shown in FIG. 2, the object connection 123 can use the 8 connection way to connect the dual-valued image generated by the above-mentioned step, in order to output the coordinate values and image pixels of object at the left, right, up, and bottom sides of horizontal and vertical line segments. The 8 connection way is used to determine if two points belong to an object. Firstly judge whether two black points are adjacent, that is, whether two black points lie at the upper left, up, upper right, left, right, lower left, bottom, and lower right position. If two black points appear at any position of these 8 positions, it means any two dual-valued black points are connected each other. They can be regarded as the same object, which is so-called 8 connection way.

Figure 3:
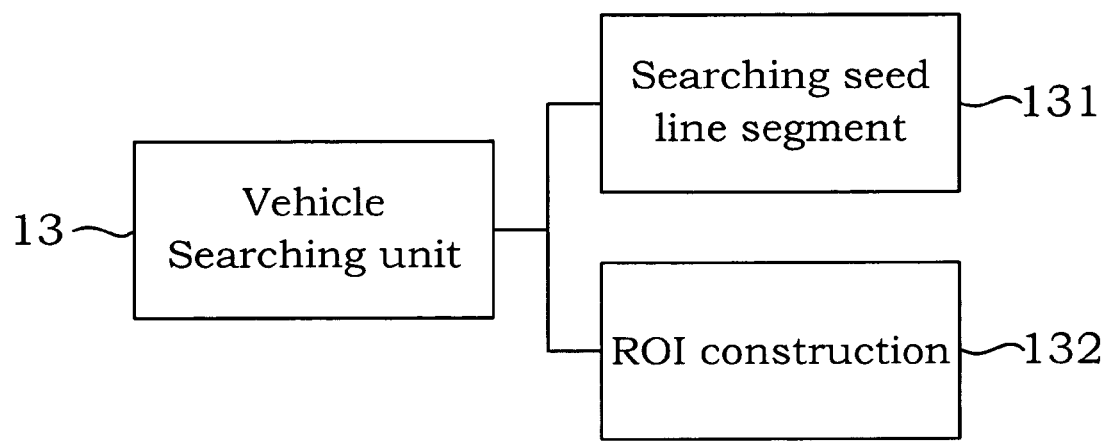
FIG. 3 schematically shows the searching vehicle unit of the invention.

As shown in FIG. 3, the function of searching object (vehicle) unit 13 is to search the possible region of vehicle through the vehicle features in a single right image. It includes the searching seed line segment 131 and the region of interest (ROI) construction 132.

As shown in FIG. 3, the searching seed line segment 131 can be used to facilitate the judgment of vehicle features, when the horizontal features of vehicle are continuous and distinct after the dual-valued image is generated by the pre-process. In this step, the horizontal line segments close to the vehicle features are found sequentially as the ROI of obstacle in the object connection matrices. The closest forward obstacle owns the highest threat level. Thus, the near-to-far method is used to find the obstacle from the bottom to the top row of input image.

As shown in FIG. 3, the region of interest construction 132 uses the symmetry of the horizontal edge line segment to define the two-dimensional candidate region from the bottom to the top row of input image. The horizontal and vertical edge projection is carried out to obtain the highest and the second highest position, in order to cut the coordinate information correctly.

Figure 4:
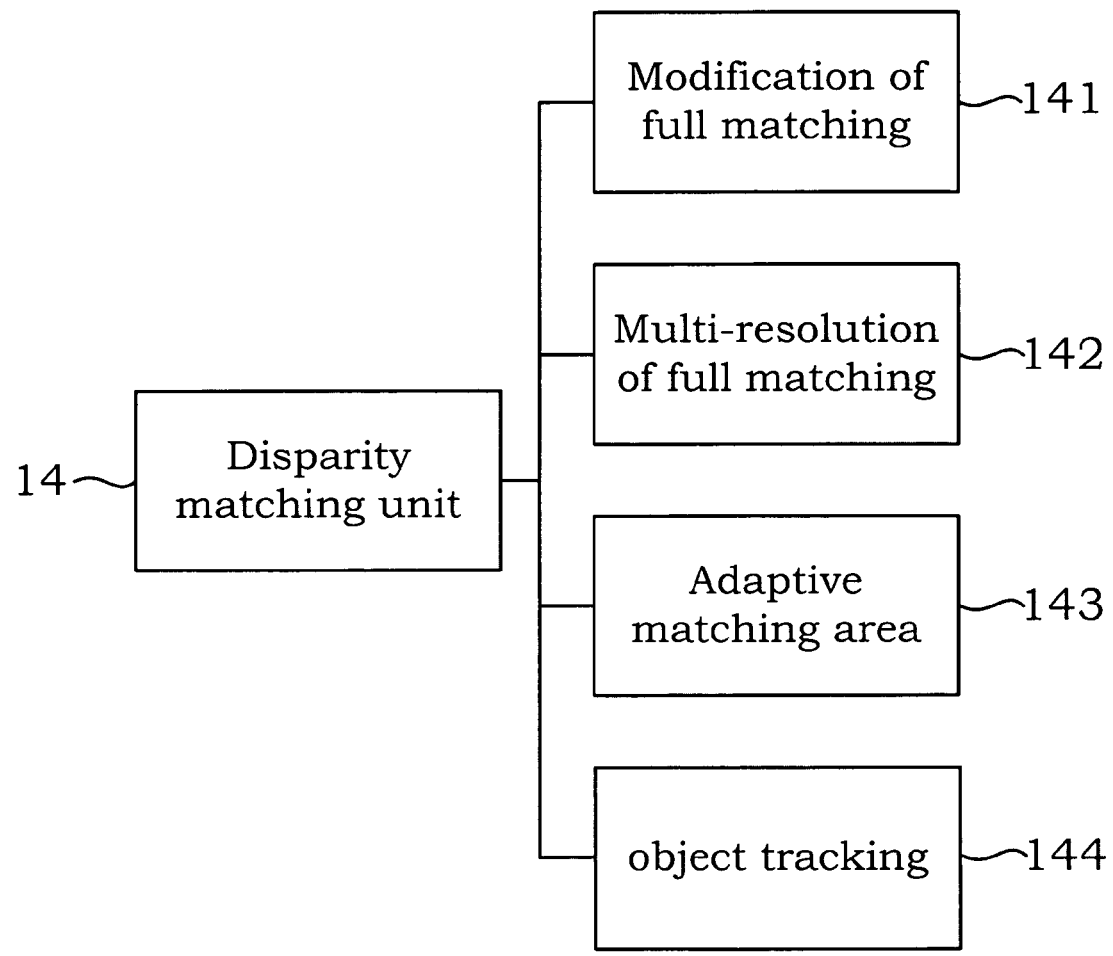
FIG. 4 schematically shows the disparity matching unit of the invention.

As shown in FIG. 4, the disparity matching unit 14 carries out the full matching for the pixels of the right image and left image to obtain the disparity value. The invention can carry out the modification of full matching 141 to remove the illumination difference between dual images. It also has the function of multi-resolution of full matching 142, adaptive matching area 143, and object tracking 144 to overcome the $\Delta Y$ problem generated by asynchronous cameras, and raise the matching accuracy and the computing speed.

As shown in FIG. 4, the modification of full matching 141 owns the binocular independent exposure. Due to the difference of respect shutter and aperture, the illumination of binocular images will be different in the variant scene. In order to prevent the influence of variation on the accuracy of matching, the modification of full matching is used, and its operation equation is shown as follows:

Standard Full Matching Method:

$$SAD(i, j) = \sum_{k=-N/2}^{N/2} \sum_{l=-N/2}^{N/2} ABS((RP(x+k, y+l)) - (LP(i+x+k, j+y+l)))$$

N: the width of the mask
RP(x+k, y+l): the pixel of (x, y) in the right image
LP(i+x+k, j+y+l): the pixel corresponding to (x, y) in the left image Modification of Full Matching Method:

$$SAD(i, j) = \sum_{k=-N/2}^{N/2} \sum_{l=-N/2}^{N/2} ABS((RP(x+k, y+l) - RM) - (LP(i+x+k, j+y+l) - LM))$$

$$M = \frac{1}{N*N} \sum_{i=-N/2}^{N/2} \sum_{j=-N/2}^{N/2} P(i, j)$$

(The average gray value of pixel in the region)
RM: the average gray value of the matching mask in the right image
LM: the average gray value of the matching mask in the left image As for the multi-resolution of full matching 142 shown in FIG. 4, the modification of full matching is carried out first under ¼ low-resolution image. After the best pixel coordinate (x, y) is found, go back to the original image to carry out the modification of full matching from (2x−2, 2y−2) to (2x+2, 2y+2) again. Sh is the height of search area, and Sw is the width of search area. The searching loop is (N×N×Sh×Sw). When the multi-resolution of full matching is used, the searching is decreased to (N×N×Sh/2×Sw/2)+(N×N×4×4).

As for the adaptive matching area 143 shown in FIG. 4, the full matching has to increase the searching height, due to $\Delta Y$ problem of asynchronous cameras. However, if the searching height is increased, the computation of central processing unit (CPU) will also be increased, thus the adaptive matching method is proposed to conquer the problem. In the ROI generated by "ROI construction" of the invention, the modification of full matching is carried out for the sample points sequentially, in order to calculate the disparity value. Due to the disparity value of left image and right image is close for Y coordinate of every pixel in the same frame, the highest one in top 20% will be used as the reference of the following sample point. Thus the searching height can be reduced and the computation efficiency can be increased effectively without influencing the accuracy rate.

As for the object tracking 144 shown in FIG. 4, the frames own the continuity, which means the object will be appeared again in the next frame. When current frame possesses the object, the object tracking process is carried out to raise the computation efficiency and the accuracy rate.

In addition, when the vehicle coordinate information of previous frame is used, the range can be increased to carry out the horizontal and vertical edge projection to obtain the highest and the second highest position, in order to cut the coordinate information quickly and correctly.

The disparity value of previous frame can be used as the reference for the starting point of searching in the frame. It means the following computation is carried out in the modification of full matching:

$$SAD(i, j) = \sum_{k=-N/2}^{N/2} \sum_{l=-N/2}^{N/2} ABS((RP(x+k, y+l) - RM) - (LP(i+x+k, j+y+l) - LM))$$

$$i = 0, 1, 2, \ldots, Sh-1$$

$$j = 0, 1, 2, \ldots, Sw-1$$

The original variable j is from 0 to Sw−1. It will be renewed as a new range from the 2/3 to 4/3 of the disparity of the current frame in the next frame.

The original variable j is from 0 to Sw−1. It will be renewed as a new range from the 2/3 to 4/3 of the disparity of the current frame in the next frame.

As for the output unit shown in FIG. 1, the audio-visual output equipment can be used to remind or warn the drivers actively, in order take the required countermeasures.

Figure 5:
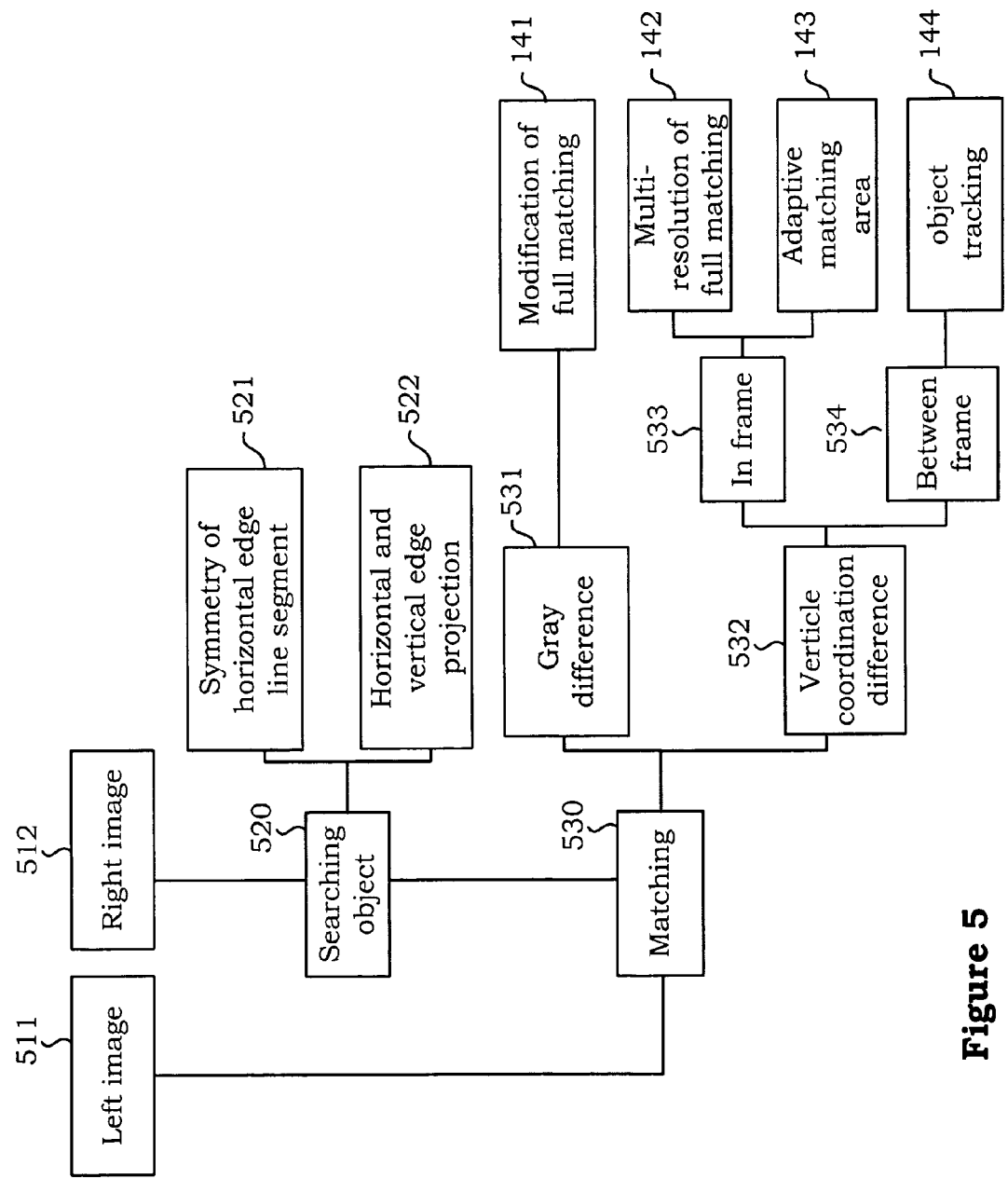
FIG. 5 schematically shows the searching process of the invention.

FIG. 5 shows a detection method for an asynchronous photography automobile-detecting apparatus of the invention. The "searching object" and "matching" modules are used as two major and basic computation ways. The "searching object" module is to find out the vehicle coordinate information in the right image mainly. The "matching" module uses the vehicle position obtained from the searching object to carry out the modification of full matching in the left image, in order to obtain the distance information.

As for the detection method for an asynchronous photography automobile-detecting apparatus of the invention shown in FIG. 5, the details are described as follows. Firstly, the stereo image acquisition unit 11 grasps the left image 511 and the right image 512. The image pre-process unit 12 and the searching object (vehicle) unit 13 are employed to carry out the searching object 520. It mainly carry out the searching for the symmetry of horizontal edge line segment 521 and the horizontal and vertical edge projection 522. Among these, the searching of seed line segment is completed by employing the symmetry of horizontal edge line segment, and the construction of ROI is completed by employing the horizontal and vertical edge projection. As shown in FIG. 5, the disparity matching unit 14 is employed to match the left image 511 and the right image 512. The matching process includes the matching of gray difference 531 and the matching of vertical coordinate variation 532. Among these, the gray difference 531 can be employed to carry out the modification of full matching 141, and the vertical coordinate variation 532 can be employed to carry out the optimization in frame 533 and the optimization between frame 534. In the optimization in frame 533, the multi-resolution of full matching 142 and the adaptive matching area 143 can be achieved. Finally, the object tracking 144 is carried out in the optimization between frame 534.

As the method for detecting the vehicle image of the invention shown in FIG. 5, after the left image 511 and the right image 512 are inputted, the right image 512 is employed to carry out the searching object 520. It mainly carry out the searching for the symmetry of horizontal edge line segment 521 and the horizontal and vertical edge projection 522. Among these, the searching of seed line segment is completed by employing the symmetry of horizontal edge line segment. The matching of the left image 511 is carried out in the matching 530. The matching process includes the matching of gray difference 531 and the matching of vertical coordinate variation 532. Among these, the gray difference 531 can be employed to carry out the modification of full matching 141, and the vertical coordinate variation 532 can be employed to carry out the optimization in frame 533 and the optimization between frame 534. In the optimization in frame 533, the multi-resolution of full matching 142 and the adaptive matching area 143 can be achieved. Finally, the object tracking 144 is carried out the optimization between frame 534.

Figure 6:
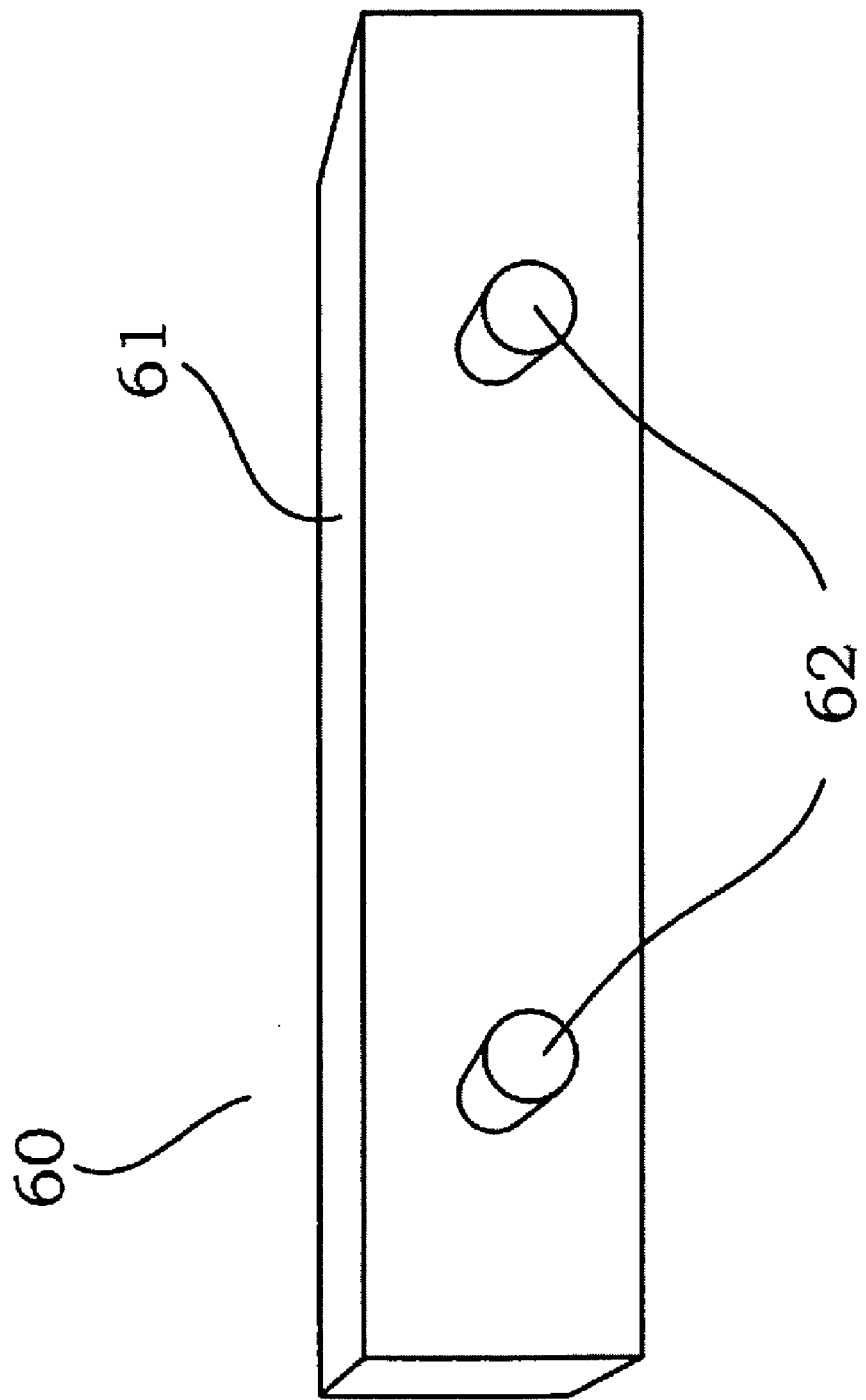
FIG. 6 schematically shows the side view for the apparatus of the invention.

As shown in FIG. 6, the asynchronous binocular image detecting apparatus 60 of the invention includes a body 61 and a lens set 62.

As shown in FIG. 7, the asynchronous binocular image detecting apparatus 60 of the invention is installed in front of the rear-view mirror 70 in the vehicle. The lens set 62 should be faced ahead, in order to camera the forward road. Its installation should satisfy the adjustment and control of various angles, including the included angle, depression angle and pitch angle. In addition, the device must be small and the device just helps follow-up quantity to produce the good and cheap result. The asynchronous image of the twin-lens of the invention is detected. The asynchronous binocular image detecting apparatus of the invention should have small volume, good effect, and low cost for mass production.

The invention can overcome the difference of asynchronous exposure between two cameras, which also can overcome the distance measurement of static and dynamic stereovision. The invention can effectively overcome the asynchronous exposure problem from dual cameras, reduce hardware construction cost of stereovision, accelerate the computing speed, and gain accurate real-time correct detection result in the practice.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An asynchronous photography automobile-detecting apparatus having two cameras, comprising:
   a stereo image acquisition unit means for capturing an image into a memory of the asynchronous photography automobile-detecting apparatus having two cameras;

an image pre-process unit having a function of a resolution image process that is scanning a horizontal direction and a vertical direction of original frame and discarding a plurality of extreme points to obtain a downsized image of original frame, a function of an edge detection operation that is detecting a contour of vehicle roof, top and bottom edges of trunk, and vehicle chassis through a simple edge detection for a clearer vehicle image, and a function of an object connection that is using the 8 connection way to connect the dual-valued image generated by the above-mentioned step, in order to output the coordinate values and image pixels of object at the left, right, up, and bottom sides of horizontal and vertical line segments so that when an edge information being used to locate a forward vehicle position, and then a disparity being obtained from a fast comparison search algorithm by a stereovision methodology, a relative distance between the forward vehicle and the two cameras being calculated according to the disparity;

an object searching unit having a function of a searching seed line segment that is facilitating a judgment of vehicle features, wherein, when a horizontal feature of vehicle being continuous and distinct after a dual-valued image being generated by the pre-process and a function of a region of interest (ROI) construction that is using a symmetry of a horizontal edge line segment to define a two-dimensional candidate region from a bottom to a top row of input image; and a disparity matching unit having functions of a modification of full matching, a multi-resolution of full matching, an adaptive matching area and an object tracking;

an output unit means for outputting a sound to generate an alarm message;

a fixation device means for fixing a asynchronous photography automobile-detecting apparatus in a vehicle, wherein the fixation device comprising a clamp to install the asynchronous photography automobile-detecting apparatus on a rear-view mirror of the vehicle.

2. The apparatus according to claim h wherein the output unit further comprises outputting an image to generate an alarm message.

3. A detection method for an asynchronous photography automobile-detecting apparatus having two cameras, comprising:

grasping a left image and a right image by a stereo image acquisition unit means for capturing an image into a memory of the asynchronous photography automobile-detecting apparatus having two cameras;

carrying out a searching object by an image pre-process unit having a function of a resolution image process that is scanning a horizontal direction and a vertical direction of original frame and discarding a plurality of extreme points to obtain a downsized image of original frame, a function of an edge detection operation that is detecting a contour of vehicle roof, top and bottom edges of trunk, and vehicle chassis through a simple edge detection for a clearer vehicle image, and a function of an object connection that is using the 8 connection way to connect the dual-valued image generated by the above-mentioned step, in order to output the coordinate values and image pixels of object at the left, right, up, and bottom sides of horizontal and vertical line segments so that when an edge information being used to locate a forward vehicle position, and then a disparity being obtained from a fast comparison search algorithm by a stereovision methodology, a relative distance between the forward vehicle and the two cameras being calculated according to the disparity and an object searching unit having a function of a searching seed line segment that is facilitating a judgment of vehicle features, wherein, when a horizontal feature of vehicle being continuous and distinct after a dual-valued image being generated by the pre-process, wherein the object searching including a searching for a symmetry of horizontal edge line segment and a searching for a horizontal and vertical edge projection; and matching the left image and the right image by a disparity matching unit, including a matching of gray difference and a matching of vertical coordinate variation, wherein the gray difference being used to carry out a modification of full matching, and the vertical coordinate variation being used to carry out an optimization in frame and an optimization between frame, wherein the optimization in frame comprising a multi-resolution of full matching and a adaptive matching area, the optimization between frame comprising an object tracking.

* * * * *